(12) United States Patent
Pongracz et al.

(10) Patent No.: US 8,446,832 B2
(45) Date of Patent: May 21, 2013

(54) DYNAMIC CONTROL OF AIR INTERFACE THROUGHPUT

(75) Inventors: Gergely Pongracz, Buapest (HU);
Szilveszter Nadas, Budapest (HU);
Sandor Racz, Cegled (HU); Zoltan Richard Turanyi, Szentendre (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 310 days.

(21) Appl. No.: 12/894,511

(22) Filed: Sep. 30, 2010

(65) Prior Publication Data

US 2012/0082033 A1  Apr. 5, 2012

(51) Int. Cl.
*H04L 12/26* (2006.01)
(52) U.S. Cl.
USPC .......................................... 370/235; 370/310
(58) Field of Classification Search
None
See application file for complete search history.

(56) References Cited

U.S. PATENT DOCUMENTS

| | | | | |
|---|---|---|---|---|
| 6,728,208 | B1 * | 4/2004 | Puuskari | 370/230.1 |
| 6,813,255 | B1 * | 11/2004 | Goderis et al. | 370/335 |
| 2002/0016837 | A1 * | 2/2002 | Naudus | 709/224 |
| 2002/0163933 | A1 * | 11/2002 | Benveniste | 370/465 |
| 2003/0039235 | A1 * | 2/2003 | Odenwalder et al. | 370/342 |
| 2004/0248583 | A1 | 12/2004 | Satt et al. | |
| 2008/0247346 | A1 * | 10/2008 | Gulbani et al. | 370/310 |
| 2009/0154402 | A1 | 6/2009 | Esseling et al. | |
| 2011/0051684 | A1 * | 3/2011 | Li et al. | 370/331 |
| 2011/0134770 | A1 * | 6/2011 | Lin et al. | 370/252 |
| 2012/0071106 | A1 * | 3/2012 | Kadous et al. | 455/67.11 |
| 2012/0106338 | A1 * | 5/2012 | Pongracz et al. | 370/235 |

FOREIGN PATENT DOCUMENTS

| | | |
|---|---|---|
| EP | 1 154 664 A1 | 11/2001 |
| WO | WO 2006/103136 A1 | 10/2006 |

OTHER PUBLICATIONS

Digital Cellular Telecommunication System (Phase 2+); Universal Mobile Telecommunications Systems (UMTS); LTE: Quality of Service (QoS); Concept and Architecture (3GPP TS 23.107 v 9.1.0 Release 9). ETSI TS 123 107 v9.1.0. Jun. 2010.

* cited by examiner

Primary Examiner — Otis L Thompson, Jr.

(57) ABSTRACT

A method and network node for dynamically controlling throughput over an air interface between a mobile terminal and a radio telecommunication system. The method detects a type of service being utilized by the mobile terminal, and dynamically selects a target delay for the traffic between a base station and the mobile terminal. The detecting may be done by a Deep Packet Inspection (DPI) engine implemented in a core network node such as a Gateway GPRS Support Node (GGSN). When the mobile terminal activates a delay-sensitive service, the target delay is dynamically changed to a smaller value to reduce latency. When the mobile terminal deactivates all delay-sensitive services, the target delay is dynamically changed to a larger value to increase throughput.

16 Claims, 4 Drawing Sheets

DYNAMIC CONTROL OF AIR INTERFACE THROUGHPUT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to radio telecommunication systems. More particularly, and not by way of limitation, the present invention is directed to a system and method for dynamically controlling throughput over the air interface between a mobile terminal and a radio telecommunication network.

The length of the packet queue (PQ) in a Node-B (base station) is handled by High-Speed Downlink Packet Access (HSDPA) flow control (FC). The flow control process contends with two somewhat contradictory goals: (1) keep the PQ length short for low delay (low latency), which is good for time-sensitive traffic; and (2) keep the PQ length long enough to avoid under-utilization of the available radio bearer, as when there is an empty PQ buffer while there are packets waiting in the Radio Network Controller (RNC).

The existing HSDPA FC algorithm tries to fulfill both requirements by dynamically setting the shaping rate of the packet flow in the RNC. The shaping rate is set relative to a target delay according to the following algorithm:

If the estimated delay (PQ length) is smaller than the target delay, then HSDPA FC increases the shaper bit rate; and
If the estimated PQ length is larger than the target delay, then the HSDPA FC decreases the shaper bit rate.

Performance of the Uu interface between the mobile terminal and the Node B depends highly on the target delay selected by the HSDPA FC algorithm.

The main problem with the existing HSDPA FC algorithm is that there is no target delay that is optimal for all types of traffic. Delay-sensitive traffic (for example, online gaming traffic) requires a very small target delay, while "throughput oriented" traffic (for example, downloading a large file) should use a higher target delay to avoid underutilization of the available radio resource. The existing HSDPA FC algorithm adjusts the shaper bit rate to match the target delay set by the operator, but it does not change the target delay. When a user utilizes services from both types, preference is usually given to the delay-sensitive traffic. It is acceptable if the download speed drops, for example 20 percent, but delay of online gaming traffic is far less tolerable.

BRIEF SUMMARY OF THE INVENTION

The present invention dynamically selects a target delay according to the type of service being utilized. Whenever a user activates a delay-sensitive service, the target delay is dynamically changed to a smaller value to reduce latency. If a user terminates all delay-sensitive services, the target delay is dynamically changed to a larger value to maximize download speed. This satisfies the normal user preference not to have the delay-sensitive traffic impacted by other services.

In one embodiment, the present invention is directed to a computer-controlled method of dynamically controlling throughput over an air interface between a mobile terminal and a radio telecommunication system, wherein the radio telecommunication system includes a radio access network and a core network. The method includes the steps of determining by a core network node, whether a traffic flow (service) for the mobile terminal is delay-sensitive; when there is no delay-sensitive traffic flow for the mobile terminal, maintaining a radio access bearer (RAB) for the mobile terminal in a throughput-oriented mode; and when there is a delay-sensitive traffic flow for the mobile terminal, changing the target delay parameter to establish a low-delay RAB for the mobile terminal.

In another embodiment, the present invention is directed to a core network node for dynamically controlling throughput over an air interface between a mobile terminal and a radio telecommunication system, wherein the radio telecommunication system includes a radio access network and a core network. The node includes means for monitoring traffic for the mobile terminal and determining whether the traffic is delay-sensitive or throughput-oriented; means for causing the radio access network to maintain a RAB for the mobile terminal in a throughput-oriented mode, responsive to a determination that the traffic for the mobile terminal is throughput-oriented; and means for causing the radio access network to change a target delay parameter to a lower value to establish a low-delay RAB for the mobile terminal, responsive to a determination that the traffic for the mobile terminal is delay-sensitive.

In another embodiment, the present invention is directed to a computer-controlled method of dynamically controlling throughput over an air interface between a mobile terminal and a radio telecommunication system, wherein the radio telecommunication system includes a radio access network and a core network. The method includes the steps of detecting a type of service being utilized by the mobile terminal; and dynamically selecting a target delay for the traffic between a base station and the mobile terminal.

The present invention improves the performance of the Uu interface between the mobile terminal and the Node B, providing improved delay and throughput performance. In addition, the invention supports delay-sensitive traffic when a secondary bearer cannot be set up due to technical reasons, operator policies, or heavy traffic load.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

In order to dynamically select a target delay according to the type of service being utilized, a controlling node must first identify the type of service and its associated flow requirements. In one embodiment, this may be done by defining categories of services, i.e., delay-sensitive (low latency) flow, or throughput-oriented flow. Then, using Deep Packet Inspection (DPI) functionality in a core network node, the user traffic can be analyzed and classified into the categories above.

After this traffic-identification process is done, the controlling DPI node knows whether the user has delay-sensitive (low latency) traffic or not, and signals the HSDPA FC entity in the Node B accordingly. If there is a change in the user behavior (for example, the user starts to use a delay-sensitive application), the DPI node signals the change to the HSDPA FC entity, which then changes the target delay value.

Figure 1:
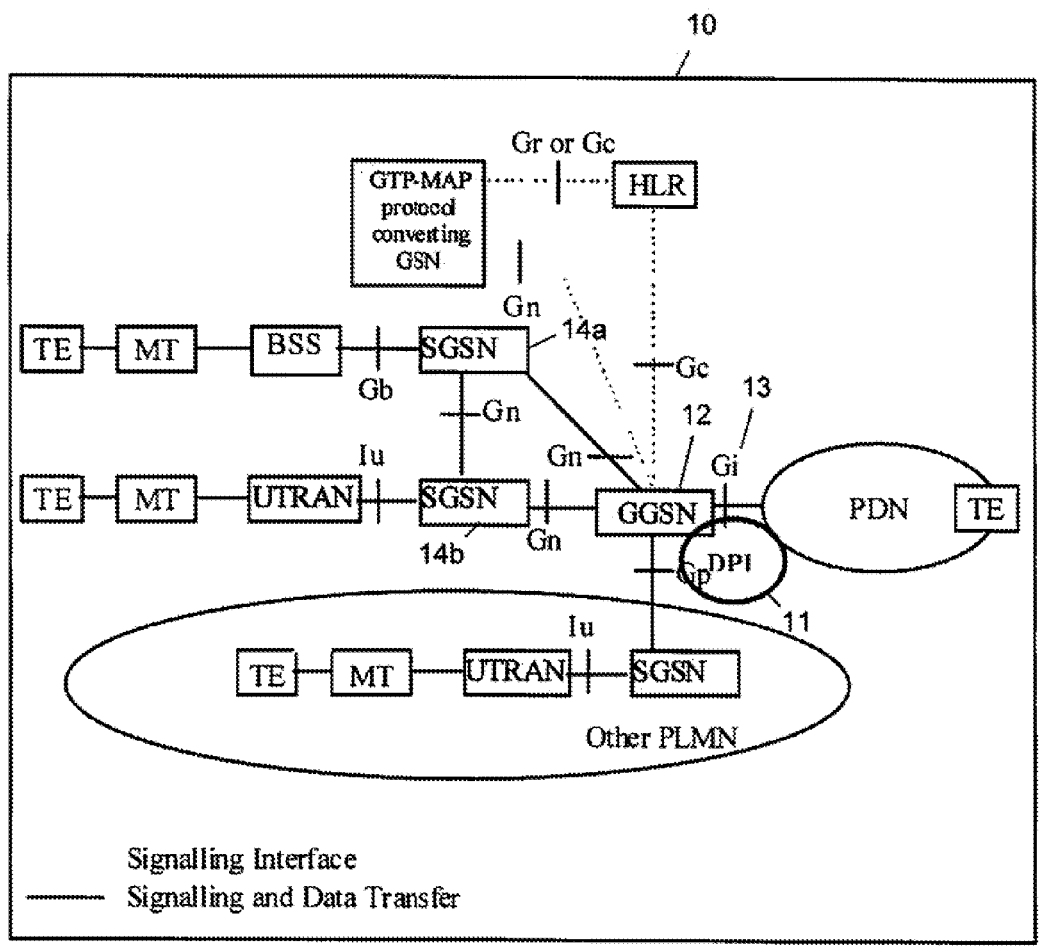
FIG. 1 is a simplified block diagram of a first exemplary embodiment of a telecommunication system architecture in which DPI functionality has been implemented in accordance with the teachings of the present invention.

FIG. 1 is a simplified block diagram of a first exemplary embodiment of a telecommunication system architecture 10 in which a DPI Engine 11 has been implemented in accordance with the teachings of the present invention. The DPI Engine is implemented either in the Gateway GPRS Support Node (GGSN) 12 or in a separate entity (not shown) on the Gi interface 13. The GGSN embodiment is preferred since the required GPRS Tunneling Protocol-Control (GTP-C) protocol is already part of the GGSN. The GTP-C protocol is used within the GPRS core network for signaling between the GGSN and Serving GPRS Support Nodes (SGSNs) 14a-14b. This allows each SGSN to activate a session on a user's behalf (user initiated PDP context activation), to deactivate the same session, to adjust quality of service parameters, or to update a session for a subscriber who has just arrived from another SGSN.

When the DPI Engine 11 in the GGSN detects that the user is switching to or from a delay-sensitive service, the GGSN 12 informs the SGSN serving the user, such as SGSN 14a. Preferably, the GGSN uses only standardized GTP messages, although non-standard messages may also be utilized. In one embodiment, the GGSN sends an Update PDP Context Request message to the SGSN. The SGSN then coordinates with the Radio Access Network (RAN) to adjust the target delay in the HSDPA FC entity in the Node B/base station accordingly.

The GGSN may signal the SGSN to either create a new secondary Radio Access Bearer (RAB), to modify an already active secondary bearer by adding the new flow's Traffic Flow Templates (TFTs), or to modify the default RAB. For example, when the user switches to a delay-sensitive service, the GGSN looks for a secondary bearer that can accommodate the flow. If there is no such bearer, but one could be created, the GGSN may request the SGSN to create a new best effort, but low-latency secondary RAB and to map the low-latency flow to the new RAB. If a low-latency secondary RAB already exists, the GGSN simply updates the secondary RAB via an Update PDP Context Request to contain the new flow. Alternatively, the Update PDP Context Request may request the SGSN to modify the default RAB so it enters "low latency" mode, meaning smaller delay, and slightly lower throughput.

The second case is always possible, while the first case is only possible for certain users (depending on configuration) and network situation. For example, in a high load it may not be possible to create new bearers. During default RAB modification, the RNC may adjust the target delay parameter of the HSDPA FC entity to a value of 20-50 ms, for example, for low-latency mode or to a value of 100-200 ms, for example, for throughput-oriented mode. The RNC may also adjust Active Queue Management (AQM) parameters of the flow based on delay requirements. In case of a Long Term Evolution (LTE) access network, the Radio Link Control (RLC) AQM Service Data Unit (SDU) parameter may be modified instead of the FC parameter.

Figure 2:
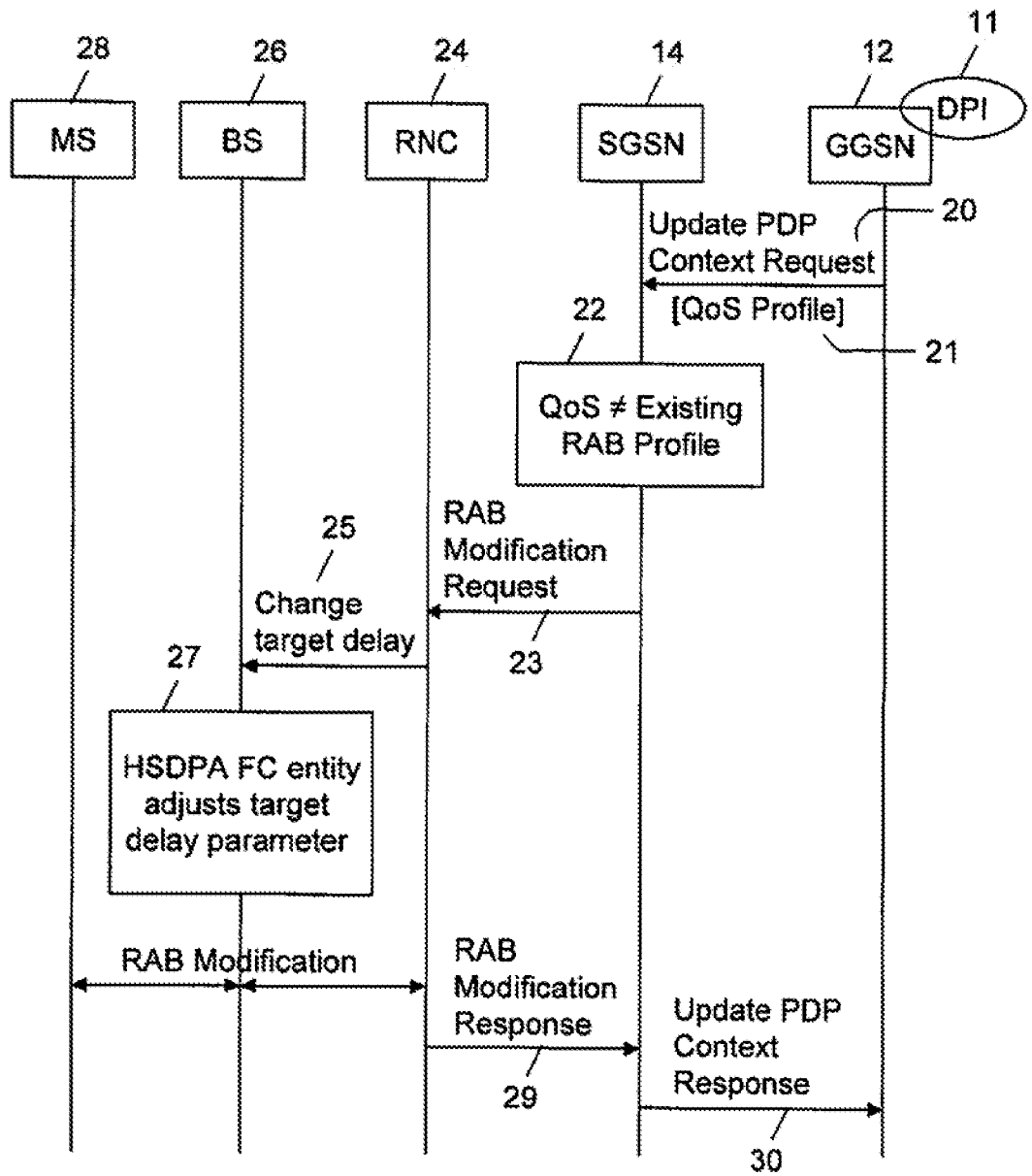
FIG. 2 is a signaling diagram illustrating the messages sent during a first exemplary embodiment of a DPI-initiated Update PDP Context process.

FIG. 2 is a signaling diagram illustrating the messages sent during a first exemplary embodiment of a DPI-initiated Update PDP Context process in which a default RAB is changed. The GGSN 12 sends an Update PDP Context Request message 20 to the SGSN 14. A Quality of Service (QoS) Profile 21 in the message indicates a request for either a low-latency or a high-throughput bearer. At 22, the SGSN detects that the requested QoS profile is different from the existing RAB profile. In response, the SGSN sends a Radio Access Bearer Modification Request 23 to the Radio Network Controller (RNC) 24 in the RAN. At 25, the RNC applies the new requested profile by instructing the base station (BS) 26 to change the target delay. This may be done, for example, by using an optional field in Iub Frame Protocol (FP) data frames. Since Iub FP data frames are not acknowledged, the information may be sent periodically (for example, every 100 msec) for a given period (for example, 1 sec). At 27, the HSDPA FC entity in the base station adjusts the target delay parameter. The RNC and base station coordinate with the mobile station (MS) 28 to implement the bearer change. When the default RAB is changed, the RNC sends a Radio Access Bearer Modification Response 29 to the SGSN 14. The SGSN then sends an Update PDP Context Response 30 back to the GGSN 12 indicating the successful change. The DPI Engine 11 saves the user state.

Figure 3:
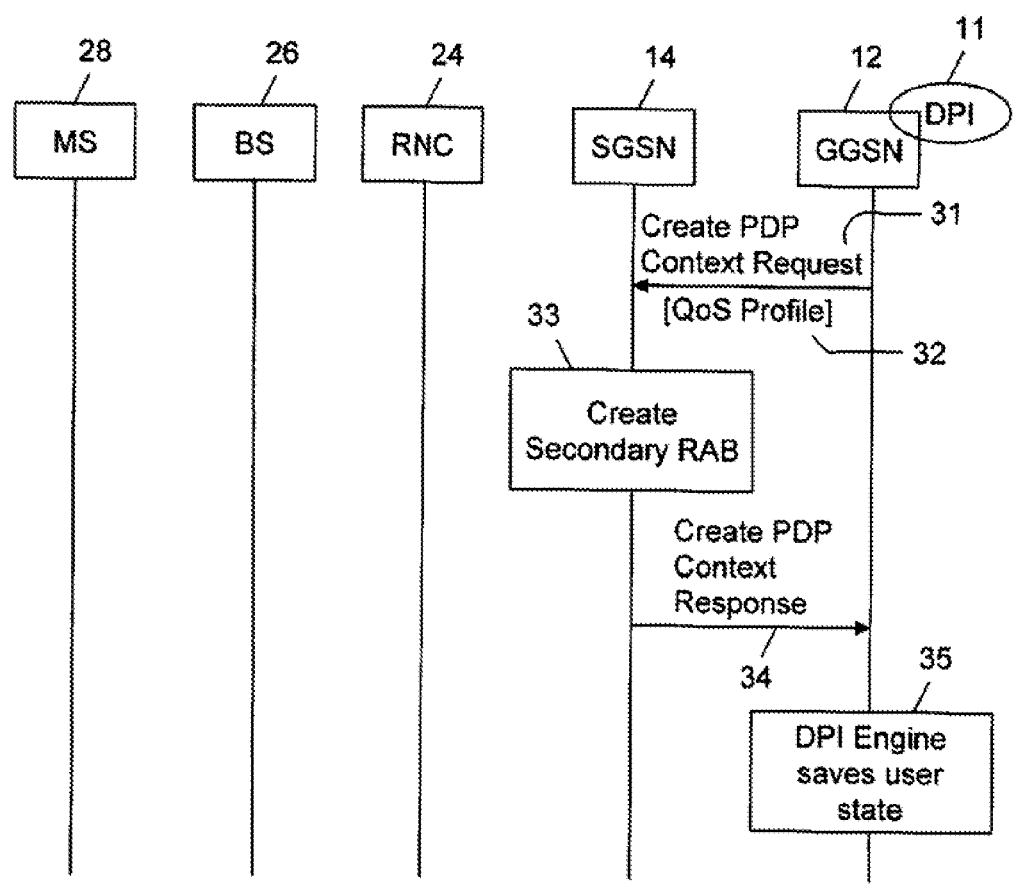
FIG. 3 is a signaling diagram illustrating the messages sent during a second exemplary embodiment of a DPI-initiated Update PDP Context process.

FIG. 3 is a signaling diagram illustrating the messages sent during a second exemplary embodiment of a DPI-initiated Create PDP Context process in which a secondary RAB is created. The GGSN 12 sends a Create PDP Context Request message 31 to the SGSN 14. The QoS Profile 32 in the message indicates a request for a low-latency secondary RAB. At 33, the SGSN initiates secondary RAB creation. After success, the SGSN sends a Create PDP Context Response 34 back to the GGSN 12 indicating the successful creation. At 35, the DPI Engine 11 saves the user state.

If a secondary RAB already exists, the GGSN 12 sends an Update PDP Context Request message to the SGSN instead of the Create PDP Context Request message 31. The update message is used to add Traffic Flow Templates (TFTs) and to modify bearer parameters for the secondary RAB. The SGSN modifies the secondary RAB then returns an Update PDP Context Response message to the GGSN in a process similar to FIG. 2.

Figure 4:
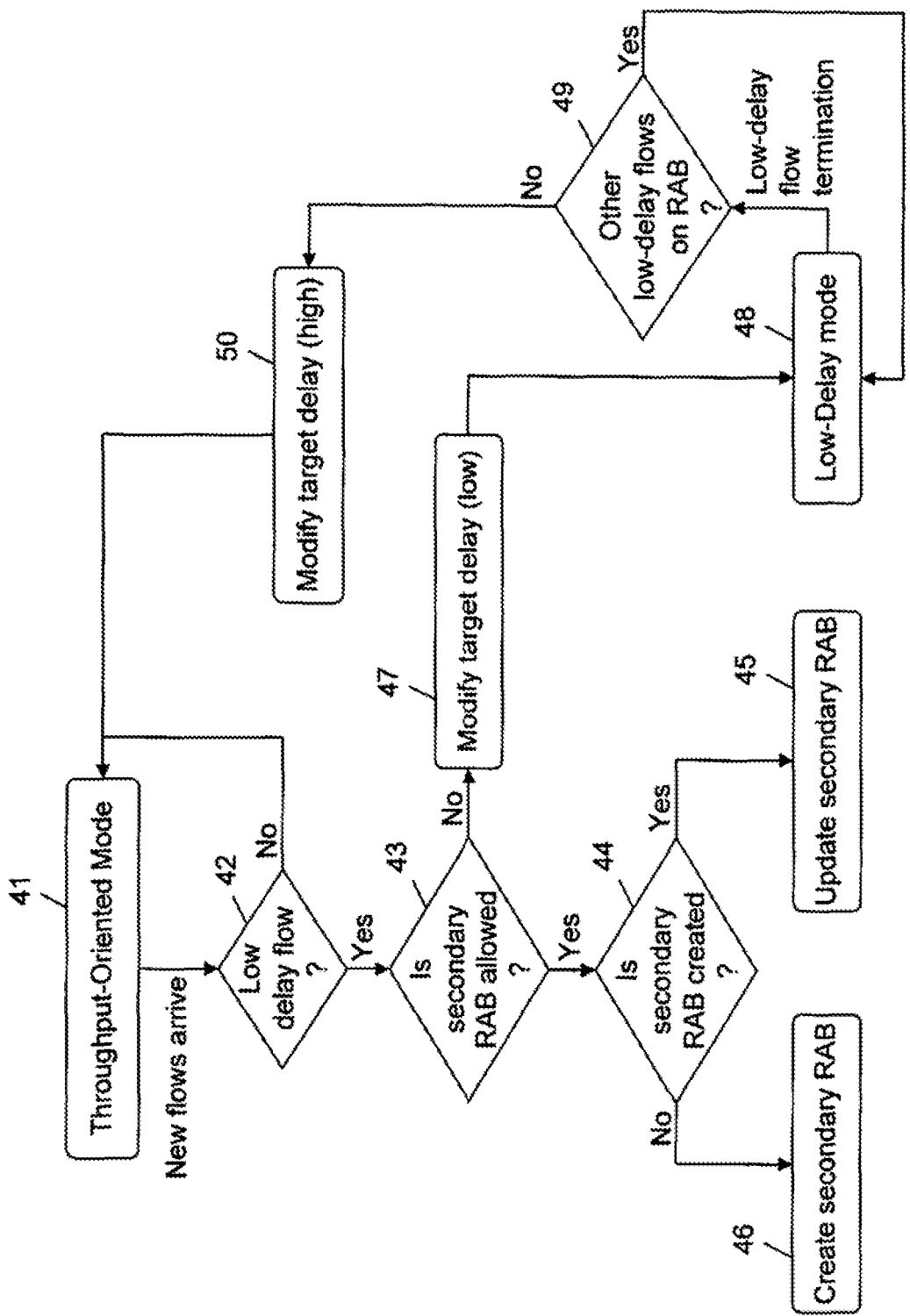
FIG. 4 is a flow chart illustrating the steps of an exemplary embodiment of the method of the present invention.

FIG. 4 is a flow chart illustrating the steps of an exemplary embodiment of the method of the present invention. At step 41, all users start in throughput-oriented mode after attachment. At step 42, the DPI Engine 11 examines new flows and determines whether a flow classified as low delay (delay sensitive) is identified. If not, the user remains in throughput-oriented mode. If a low delay flow is identified, the method moves to step 43, where the GGSN determines whether a secondary RAB is allowed for the identified user type. If so, the GGSN determines at step 44 whether a low-delay secondary RAB already exists. If the low-delay secondary RAB already exists, the method moves to step 45, where the low-delay flow is mapped to the existing low-delay RAB by modifying the RAB. If the low-delay secondary RAB does not exist, the method moves to step 46, where the low-delay secondary RAB is created.

If there are secondary RABs, the secondary RABs handle the low-delay traffic flows, and the primary RAB remains in throughput-oriented mode. When the DPI Engine 11 detects a low-delay flow termination, one of the secondary RABs is modified. The primary bearer is not modified by the DPI-driven actions.

If it is determined at step 43 that a secondary RAB is not allowed (which is the typical case for High Speed Packet Access (HSPA) users), the method moves from step 43 to step 47, where the primary RAB is modified with a new low target delay. In this case the primary RAB enters low-delay mode at step 48. Thereafter, the DPI Engine 11 monitors the traffic flows and if a low-delay flow termination is detected, the method moves to step 49, where the DPI Engine determines whether there are still other low-delay flows on the RAB. If so, the primary RAB remains in low-delay mode at 48. However, if there are no other low-delay flows on the RAB, the method moves to step 50, where the primary RAB is modified with a new high target delay. In this case the primary RAB returns to throughput-oriented mode at step 41.

It is possible that moving to the low-delay mode for an extended period will have an overly adverse impact on throughput. Therefore, in one embodiment, the system may automatically switch back to the throughput-oriented mode after a defined time period. Alternatively, the network may monitor downlink buffer levels for traffic destined for the mobile terminal, and if the levels rise above a threshold value, the system may automatically switch back to the throughput-oriented mode.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A computer-controlled method of dynamically controlling throughput over an air interface between a mobile terminal and a radio telecommunication system, wherein the radio telecommunication system includes a radio access network and a core network, the method comprising the steps of:
   determining by a core network node, whether there is a delay-sensitive traffic flow for the mobile terminal;
   when there is no delay-sensitive traffic flow for the mobile terminal, maintaining a radio access bearer (RAB) for the mobile terminal in a throughput-oriented mode; and
   when there is a delay-sensitive traffic flow for the mobile terminal, changing a target delay parameter to a lower value to establish a low-delay RAB for the mobile terminal, wherein the step of changing the target delay parameter includes the steps of:
      determining by a Gateway GPRS Support Node (GGSN), whether a secondary RAB is allowed for the mobile terminal;
      when the secondary RAB is not allowed, changing the target delay parameter associated with a primary RAB for the mobile terminal to modify the primary RAB to handle the delay-sensitive traffic; and
      when the secondary RAB is allowed, utilizing a low-delay target delay parameter associated with the secondary RAB to handle the delay-sensitive traffic, wherein the step of utilizing a low-delay target delay parameter includes the steps of:
         determining by the GGSN, whether the secondary RAB has already been created;
         when the secondary RAB has already been created, updating a traffic flow template (TFT) associated with the secondary RAB to handle the new delay-sensitive flow; and
         when the secondary RAB has not already been created, creating the secondary RAB with a low-delay target delay parameter to handle the delay-sensitive traffic.

2. The method according to claim 1, wherein the step of determining whether there is a delay-sensitive traffic flow for the mobile terminal is performed by a Deep Packet Inspection (DPI) engine in a Gateway GPRS Support Node (GGSN).

3. The method according to claim 1, wherein the step of determining whether there is a delay-sensitive traffic flow for the mobile terminal is performed by a Deep Packet Inspection (DPI) engine implemented in an entity on a Gi interface between a Gateway GPRS Support Node (GGSN) and a packet data network.

4. The method according to claim 1, wherein the step of changing the target delay parameter is performed by a High-Speed Downlink Packet Access (HSDPA) flow control (FC) entity in a base station in the radio access network.

5. The method according to claim 1, further comprising, after changing the target delay parameter associated with the primary RAB to handle the delay-sensitive traffic, the steps of:
   determining by the GGSN, when there is no longer any delay-sensitive traffic flow for the mobile terminal; and
   changing the target delay parameter associated with the primary RAB to modify the primary RAB to handle throughput-oriented traffic.

6. A core network node for dynamically controlling throughput over an air interface between a mobile terminal and a radio telecommunication system, wherein the radio telecommunication system includes a radio access network and a core network, the node comprising a processor coupled to a memory, wherein when the processor executes computer program instructions stored on the memory, the node is caused to perform the steps of:
   monitoring traffic for the mobile terminal and determining whether the traffic is delay-sensitive or throughput-oriented;
   causing the radio access network to maintain a radio access bearer (RAB) for the mobile terminal in a throughput-oriented mode, responsive to a determination that the traffic for the mobile terminal is throughput-oriented; and
   causing the radio access network to change a target delay parameter for the traffic to establish a low-delay RAB for the mobile terminal, responsive to a determination that the traffic for the mobile terminal is delay-sensitive, wherein the step of changing the target delay parameter includes the steps of:
      causing a Gateway GPRS Support Node (GGSN to determine whether a secondary RAB is allowed for the mobile terminal;
      when the secondary RAB is not allowed, causing the radio access network to change the target delay parameter associated with a primary RAB for the mobile terminal to modify the primary RAB to handle the delay-sensitive traffic; and
      when the secondary RAB is allowed, causing the radio access network to utilize a low-delay target delay parameter associated with the secondary RAB to handle the delay-sensitive traffic, wherein the step of utilizing a low-delay target delay parameter includes the steps of:
  causing the GGSN to determine whether the secondary RAB has already been created;
  when the secondary RAB has already been created, updating a traffic flow template (TFT) associated with the secondary RAB to handle the new delay-sensitive flow; and
  when the secondary RAB has not already been created, creating the secondary RAB with a low-delay target delay parameter to handle the delay-sensitive traffic.

7. The core network node according to claim 6, wherein the node is the GGSN, and the GGSN is configured to monitor the traffic for the mobile terminal and determine whether the traffic is delay-sensitive or throughput-oriented utilizing a Deep Packet Inspection (DPI) engine in the GGSN.

8. The core network node according to claim 6, wherein the node is a Deep Packet Inspection (DPI) engine implemented as an entity on a Gi interface between the GGSN and a packet data network.

9. The core network node according to claim 6, wherein the node is configured to cause the radio access network to change a target delay parameter by sending a Create or Update PDP Context request message toward the radio access network, wherein the message includes a requested Quality of Service (QoS) profile that causes a Radio Network Controller (RNC) to initiate the setup or the modification of a secondary RAB for the mobile terminal utilizing the low-delay target delay parameter.

10. The core network node according to claim 6, wherein the node is configured to cause the radio access network to change a target delay parameter by sending an Update PDP Context request message toward the radio access network, the Update PDP Context request message including a requested Quality of Service (QoS) profile that causes a Radio Network Controller (RNC) to initiate changing the target delay parameter for a primary RAB for the mobile terminal.

11. The core network node according to claim 10, wherein the node is configured to monitor the traffic for the mobile terminal and determine whether the traffic is delay-sensitive or throughput-oriented when there is no longer any delay-sensitive traffic for the mobile terminal, and the core network node is further configured to cause the radio access network to change the target delay parameter to associated with the primary RAB to modify the primary RAB to handle throughput-oriented traffic.

12. A computer-controlled method of dynamically controlling throughput over an air interface between a mobile terminal and a radio telecommunication system, wherein the radio telecommunication system includes a radio access network and a core network, the method comprising the steps of:
  detecting a type of service being utilized by the mobile terminal; and
  dynamically changing a target delay parameter for service traffic between a base station and the mobile terminal, wherein the step of changing the target delay parameter includes the steps of:
    determining by a Gateway GPRS Support Node (GGSN), whether a secondary radio access bearer (RAB) is allowed for the mobile terminal;
  when the secondary RAB is not allowed, changing the target delay parameter associated with a primary RAB for the mobile terminal to modify the primary RAB to handle the delay-sensitive traffic; and
  when the secondary RAB is allowed, creating the secondary RAB and utilizing a low-delay target delay parameter associated with the secondary RAB to handle the delay-sensitive traffic.

13. The method according to claim 12, wherein the step of changing the target delay parameter associated with the primary RAB includes the steps of:
  dynamically changing the target delay parameter to a larger value to maximize download speed when the mobile terminal switches from a delay-sensitive service to a throughput-oriented service; and
  dynamically changing the target delay parameter to a smaller value to reduce latency when the mobile terminal switches from a throughput-oriented service to a delay-sensitive service.

14. The method according to claim 12, wherein the detecting step includes detecting that the mobile terminal is utilizing both a throughput-oriented service and a delay-sensitive service, and the dynamically changing step includes dynamically changing the target delay to a smaller value to reduce latency for the delay-sensitive service.

15. The method according to claim 14, further comprising, after dynamically changing the target delay to a smaller value, the steps of:
  determining whether a time period has expired; and
  automatically changing the target delay to the larger value to switch to the throughput-oriented mode when the time period has expired.

16. The method according to claim 14, further comprising, after dynamically changing the target delay to a smaller value, the steps of:
  determining whether a packet level in a downlink buffer in the network for traffic destined for the mobile terminal has exceeded a threshold value; and
  automatically changing the target delay to the larger value to switch to the throughput-oriented mode when the buffer level exceeds the threshold value.

* * * * *

UNITED STATES PATENT AND TRADEMARK OFFICE
CERTIFICATE OF CORRECTION

PATENT NO. : 8,446,832 B2
APPLICATION NO. : 12/894511
DATED : May 21, 2013
INVENTOR(S) : Pongracz et al.

It is certified that error appears in the above-identified patent and that said Letters Patent is hereby corrected as shown below:

On the Title Page, in item (75), under "Inventors", in Column 1, Line 1, delete "Buapest" and insert -- Budapest --, therefor.

Signed and Sealed this
Twenty-seventh Day of August, 2013

Teresa Stanek Rea
*Acting Director of the United States Patent and Trademark Office*